United States Patent
Hicks (10) Patent No.: US 6,594,233 B1
(45) Date of Patent: Jul. 15, 2003

(54) REDUCING MESSAGE CONGESTION IN A COMMUNICATION SYSTEM

(75) Inventor: Scott Gordon Hicks, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/476,292

(22) Filed: Dec. 30, 1999

(51) Int. Cl.⁷ ............................................... G01R 31/08
(52) U.S. Cl. ........................ 370/235; 370/329; 370/341; 370/342; 370/441; 455/450; 455/455
(58) Field of Search ........................ 370/329, 330–341, 370/441–442, 228, 342, 229–235; 455/422–426, 450, 451–455

(56) References Cited

U.S. PATENT DOCUMENTS

| | | | |
|---|---|---|---|
| 5,175,867 A | | 12/1992 | Wejke et al. |
| 5,353,332 A | | 10/1994 | Raith et al. |
| 5,604,744 A | | 2/1997 | Andersson et al. |
| 5,729,540 A | * | 3/1998 | Wegrzyn ..................... 370/336 |
| 5,819,184 A | * | 10/1998 | Cashman ..................... 455/553 |
| 6,016,424 A | * | 1/2000 | Hicks et al. ................. 455/414 |
| 6,343,070 B1 | * | 1/2002 | Klas et al. .................. 370/329 |

FOREIGN PATENT DOCUMENTS

| | | |
|---|---|---|
| WO | 99/33306 | 7/1999 |

OTHER PUBLICATIONS

Suzuki, S., et al., "Performance Evaluation of Terminating-Call Reforwarding Schemes For PCS", IEICE Transactions on Communications, vol. E79 B, No. 9, pp. 1380–1387 (9/96).

TIA/EIA–136 Publication SP–4027–121–A (Nov. 20, 1998) Sections 6;8;8.1;8.2;8.3.

TIA/EIA–136 Publication SP–4027–122–A (Nov. 20, 1998) Sections 2.5;2.5.1;2.5.2.

TIA/EIA–136 Publication SP–402/–123–A (Nov. 20, 1998) Sections 5.1.1;5.1.1.1;5.1.1.1.1;6.132;6.133;6.134.

\* cited by examiner

Primary Examiner—David Vincent
Assistant Examiner—Van Nguyen (57) ABSTRACT

Methods and apparatus of reducing deleted messages in a transmitter that sends messages organized in frames, superframes, and logical channels are provided. At least one of the channels includes structure messages that describe the organization of the frames and logical channels and a number of frames to be read by a receiver, including a number of additional frames that should be read when at least one displaced message exists. One method includes the steps of finding messages to be displaced; placing found messages in a displacement queue, and assigning messages to a frame according to a predetermined order of logical channels, including any displaced messages that fit in the frame. A message is displaced if it will not be sent in a frame of at least one logical channel and will timeout before it can next be sent, and if a message is placed in the displacement queue, then an information element is set in a message, indicating that the number of additional frames is to be read. Further steps may include removing any displaced messages included in the frame from the displacement queue, and deleting any displaced messages left in the displacement queue and sending respective notification messages for deleted displaced messages. A receiver reads the number of additional frames in response to the set information element. Suitable apparatus are also disclosed.

11 Claims, 7 Drawing Sheets

FIG. 1
PRIOR ART

F = F-BCCH
E = E-BCCH
S = S-BCCH
SPACH = PCH or ARCH or SMSCH

REDUCING MESSAGE CONGESTION IN A COMMUNICATION SYSTEM

BACKGROUND

Applicant's invention relates to electrical telecommunication, and more particularly to wireless communication systems, such as cellular and satellite radio systems, for various modes of operation (analog, digital, dual mode, etc.), and for access techniques such as frequency division multiple access (FDMA), time division multiple access (TDMA), code division multiple access (CDMA), and hybrid FDMA/TDMA/CDMA.

In a TDMA cellular radio telephone system, each radio channel is divided into a series of time slots, each of which contains a burst of information from a data source, e.g., a digitally encoded portion of a voice conversation or digital control information. The time slots are grouped into successive frames that each have a predetermined duration. Successive time slots assigned to the same user, which are usually not consecutive time slots on the radio carrier, constitute a logical channel assigned to the user. As described in more detail below, such logical channels are provided for communicating control signals and for voice and data signals.

It can be seen that a TDMA cellular system operates in a buffer-and-burst, or discontinuous-transmission, mode: each terminal transmits (and receives) only during its assigned time slots or frames. Therefore, portions of the terminal, or mobile station (MS), which may be battery-powered, can be switched off, or "sleep", to save power during the time slots when it is neither transmitting nor receiving. During assigned slots, a MS awakes and monitors the control channel for paging messages addressed to it.

For example, when an ordinary telephone (land-line) subscriber calls a mobile subscriber, the call is directed from the public switched telephone network (PSTN) to a mobile switching center (MSC) that analyzes the dialed number. If the dialed number is validated, the MSC requests some or all of a number of radio base stations (BSs) to page the called MS by transmitting over their respective control channels page messages that contain information, such as a mobile identification number (MIN), that identifies the called MS.

Each idle MS receiving a paging message compares the received identifying information with its own stored information. The MS having the matching identifying information transmits a page response over the particular control channel to the BS, which forwards the page response to the MSC. Upon receiving the page response, the MSC selects a traffic channel available to the BS that received the page response, switches on a corresponding radio transceiver in that BS, and causes that BS to send a message via the control channel to the called MS that instructs the called MS to tune to the selected voice or traffic channel. A through-connection for the call is established once the MS has tuned to the selected traffic channel.

A fully digitized type of cellular network uses logical channels for communicating digital voice or data as well as control information. One such digital cellular standard is defined by the TIA/EIA-136 standard, which is promulgated by the Telecommunications Industry Association and the Electronic Industries Association and is being adopted rapidly throughout the world. A cellular network implementing the TIA/EIA-136 standard transmits control information over digital control channels (DCCHs). A forward or downlink (BS to MS) DCCH includes successive repetitions of an ordered sequence of logical channels that makes up what is called a superframe. Such networks are described in U.S. Pat. No. 5,604,744 to Andersson et al. for "Digital Control Channels Having Logical Channels for Multiple Access Radiocommunication", which is incorporated in this application by reference.

Figure 1:
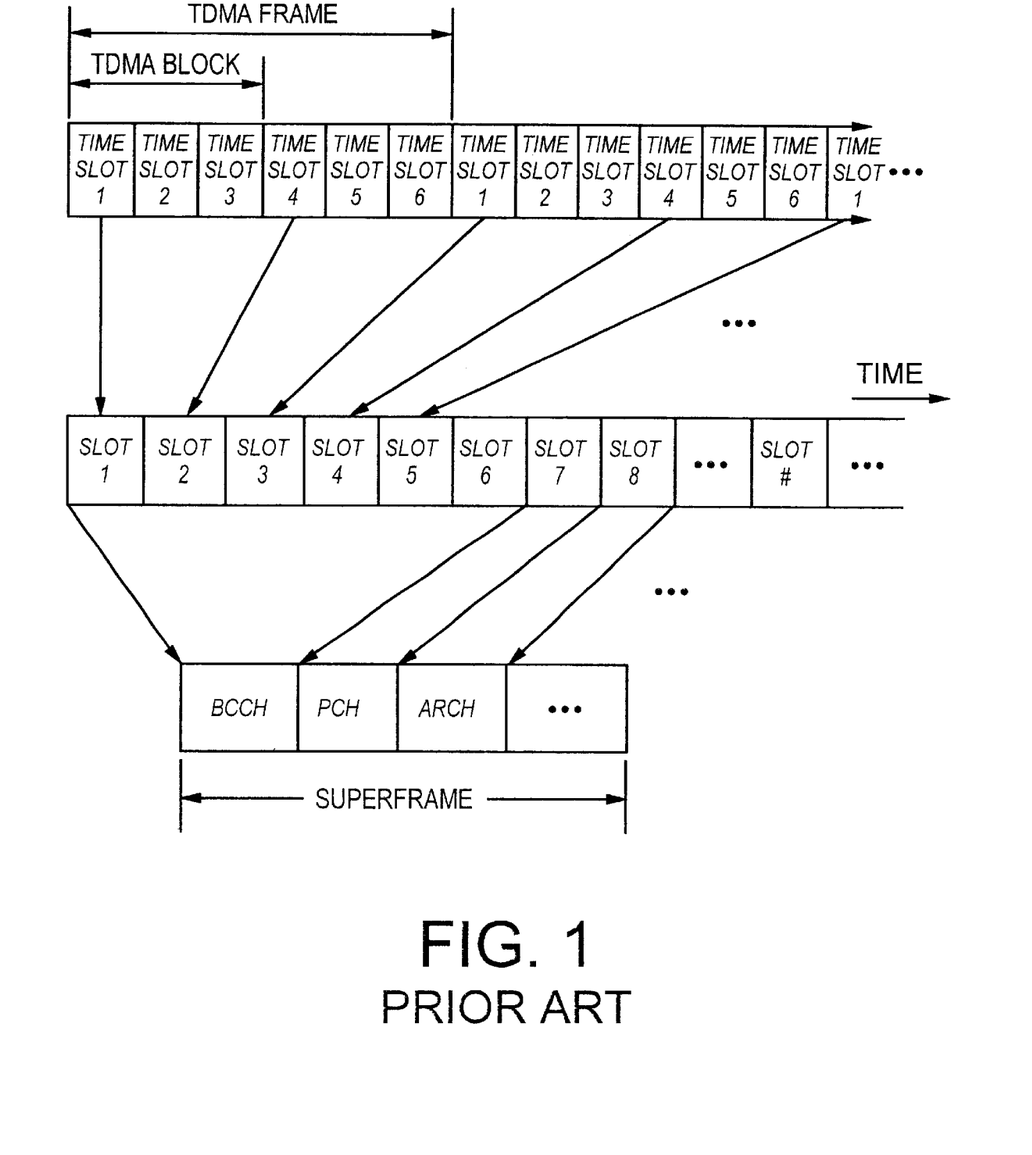
FIG. 1 shows a known forward DCCH configured as a succession of time slots included in the consecutive time slots sent on a carrier frequency.

FIG. 1 shows a general example of a forward DCCH configured as a succession of time slots 1, 2, . . . , N, . . . included in the consecutive time slots 1, 2, . . . sent on a carrier signal. The DCCH slots may be defined on a radiofrequency carrier signal such as that specified by TIA/EIA-136, and may consist, as seen in FIG. 1 for example, of every n-th slot in a series of consecutive slots that can be organized in TDMA blocks and frames. Each slot may have a duration of 6.67 milliseconds (ms), which is also the duration of a traffic-channel slot according to the TIA/EIA-136 standard. As shown in FIG. 1, the DCCH slots may themselves be organized into superframes (SF), and a superframe according to the standard may include thirty-two DCCH slots and have a duration of 640 ms.

Each superframe typically includes an ordered sequence of a number of logical channels that carry different kinds of information. One or more DCCH slots may be allocated to each logical channel in the superframe. The downlink superframe depicted in FIG. 1 includes at least three logical channels: a broadcast control channel (BCCH) that includes six successive DCCH slots for overhead messages; a paging channel (PCH) that includes one slot for paging messages; and an access response channel (ARCH) that includes one slot for channel assignment and other messages. Other channels may be included in the exemplary superframe of FIG. 1, such as additional PCHs or other channels. As described in more detail below, other organizations of channels in a superframe are possible.

Figure 2:
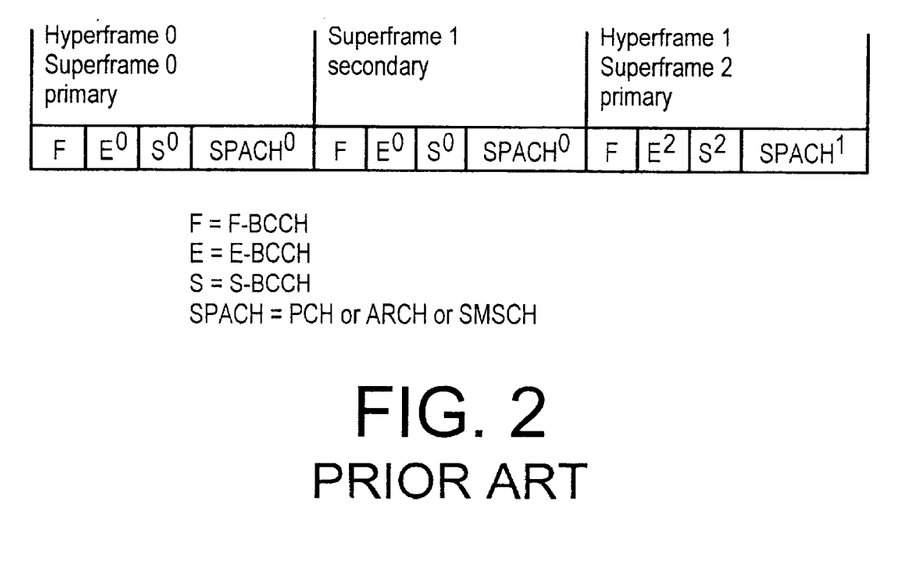
FIG. 2 shows a known hyperframe structure of a forward DCCH.

The superframes of a forward DCCH are advantageously organized into hyperframes, with one arrangement being depicted by FIG. 2 in accordance with the TIA/EIA-136 standard. Each hyperframe comprises two superframes, one of which is usually designated the primary superframe and the other of which is usually designated the secondary superframe. A complete hyperframe (hyperframe 0) and a successive partial hyperframe (hyperframe 1) are shown in FIG. 2. Each superframe comprises time slots that are organized into the following logical channels: a fast BCCH (F-BCCH), an extended BCCH (E-BCCH), a short message service BCCH (S-BCCH), and a SPACH. The SPACH typically comprises a short message service channel (SMSCH), a plurality of PCHs, and an ARCH, although any combination of these can make up a given SPACH frame. As noted above, each superframe may also include slots for other logical channels.

According to the TIA/EIA-136 standard, each superframe includes a complete set of F-BCCH information, which is system-related information such as the structure of the DCCH that a MS uses for accessing and maintaining communication with the BSs. This is described in Section 5.1.1, for example, of TIA/EIA Pub. No. SP-4027-123-A (Nov. 20, 1998). Also, every PCH in a primary superframe is repeated in the corresponding secondary superframe. Each MS is hashed to a DCCH in a cell based on a number of parameters, including portions of its user group identity or permanent mobile station identity, the number of DCCHs in the cell, and the number of slots allocated to the DCCHs. This process is described in TIA/EIA Pub. No. SP-4027-121-A, Section 8.1 (Nov. 20, 1998), which is incorporated in this application by reference.

Besides supporting sleep modes for MSs, digital control and traffic channels facilitate optimization of system capacity and support hierarchical cell structures, i.e., structures of macrocells, microcells, picocells, etc. The term "macrocell" generally refers to a cell having a size comparable to the sizes of cells in a conventional cellular telephone system (e.g., a radius of at least about 1 kilometer), and the terms "microcell" and "picocell" generally refer to progressively smaller cells. For example, a microcell might cover a public indoor or outdoor area, e.g., a convention center or a busy street, and a picocell might cover an office corridor or a floor of a high-rise building. From a radio coverage perspective, macrocells, microcells, and picocells may be distinct from one another or may overlap one another to handle different traffic patterns or radio environments.

Figure 3:
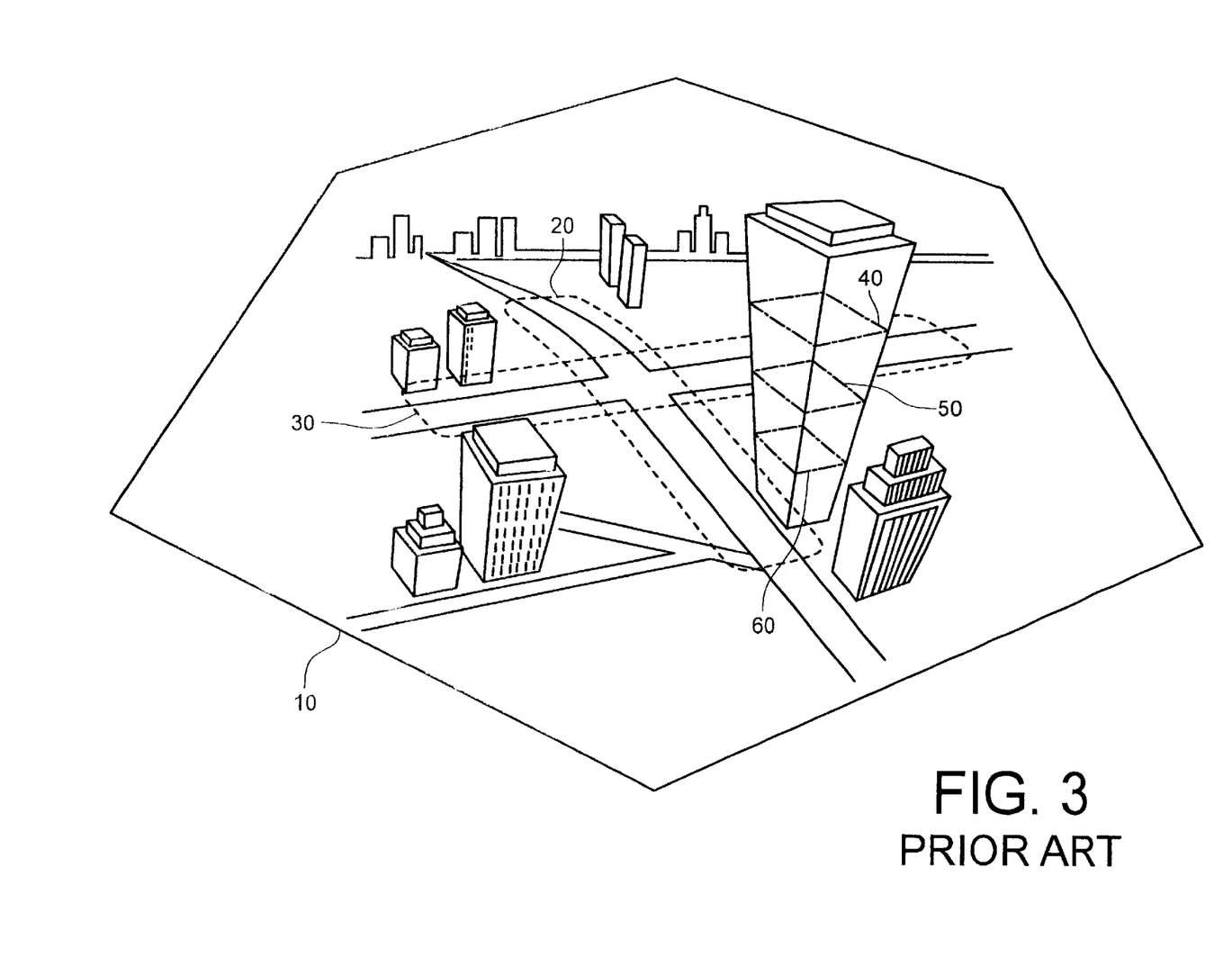
FIG. 3 illustrates a known exemplary hierarchical, or multi-layered, cellular system.

FIG. 3 is an exemplary hierarchical, or multi-layered, cellular system. An umbrella macrocell 10 represented by a hexagonal shape makes up an overlying cellular structure. Each umbrella cell may contain an underlying microcell structure. The umbrella cell 10 includes microcell 20 represented by the area enclosed within the dotted line and microcell 30 represented by the area enclosed within the dashed line corresponding to areas along city streets, and picocells 40, 50, and 60, which cover individual floors of a building. The intersection of the two city streets covered by the microcells 20 and 30 may be an area of dense traffic concentration, and thus might represent a hot spot.

Figure 4:
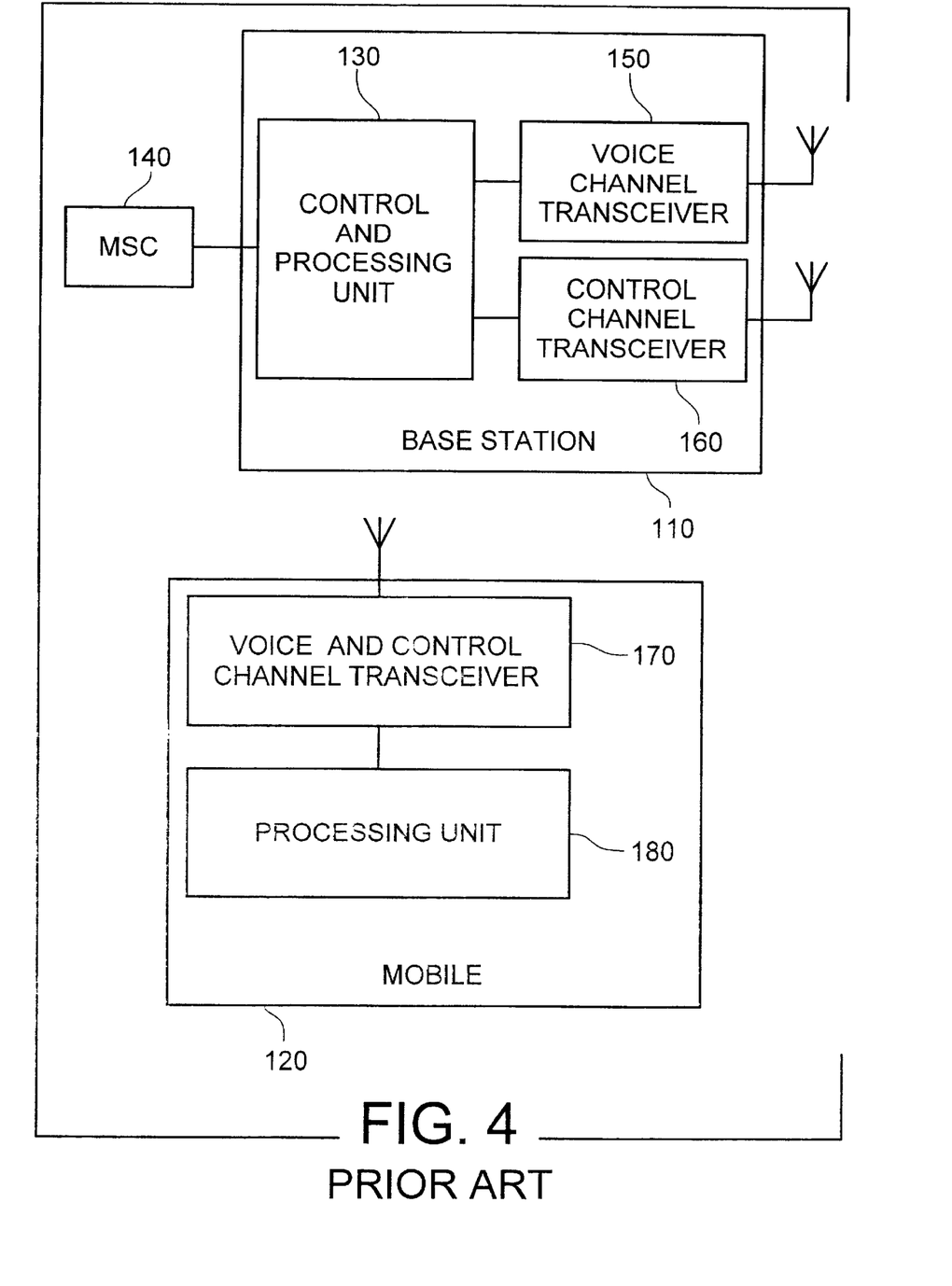
FIG. 4 is a block diagram of a known exemplary cellular mobile radiotelephone system, including an exemplary base station and mobile station.

FIG. 4 represents a block diagram of an exemplary cellular mobile radio telephone system, including an exemplary BS 110 and MS 120. The BS 110 includes a control and processing unit 130, which is connected to an MSC 140, which in turn is connected to a PSTN (not shown). General aspects of such cellular radio telephone systems are known in the art, as described for example by U.S. Pat. No. 5,175,867 to Wejke et al. for "Neighbor-Assisted Handoff in a Cellular Communication System" and U.S. Pat. No. 5,353,332 to Raith et al. for "Method and Apparatus for Communication Control in a Radiotelephone System". Both of these patents are incorporated in this application by reference.

The BS 110 handles a plurality of voice channels through one or more voice channel transceivers 150, which are controlled by the control and processing unit 130. Also, each BS includes at least one control channel transceiver 160, which may be capable of handling more than one control channel. The control channel transceiver 160 is controlled by the control and processing unit 130. The control channel transceiver 160 broadcasts control information over the control channel of the BS or cell to MSs locked to that control channel. It will be understood that the transceivers 150 and 160 can be implemented as a single device, like the voice and control transceiver 170, for use with DCCHs and other channels.

The MS 120 receives the information broadcast on a control channel at its voice and control channel transceiver 170, and the processing unit 180 evaluates the received control channel information, which includes the characteristics of cells that are candidates for the mobile station to lock on to, and determines on which cell the mobile should lock.

Under the TIA/EIA-136 standard, PCHs belonging to particular DCCHs are allocated to MSs based on a number of parameters, including for example each MS's user group identity and its permanent mobile station identity, which can be a MIN. This process is described in Sections 8 and 8.2 of TIA/EIA Pub. No. SP-4027-121-A (Nov. 20, 1998), which are incorporated in this application by reference. In general, the page messages in a TIA/EIA-136 system may be scattered over many PCHs of a DCCH, and depending on the configuration of the network, a cell may further scatter its PCH channels over many DCCHs.

One consequence of MS sleep mode is that page messages can only be sent in assigned PCHs, which allows for potential congestion of the PCHs. This consequence is built into the TIA/EIA-136 definition of PCH functionality and has been observed in practice. Some network operators have complained that they see a higher number of rejected page messages than they would expect on their DCCHs, which should have higher nominal capacity than analog control channels.

SUMMARY

It is an object of Applicant's invention to address this and other aspects of current telecommunication systems by providing methods of reducing deleted messages in a transmitter that sends messages organized in frames, superframes, and logical channels. At least one of the channels includes structure messages that describe the organization of the frames and logical channels and a number of frames to be read by a receiver, including a number of additional frames that should be read when at least one displaced message exists.

In one aspect of Applicant's invention, a method includes the steps of finding messages to be displaced; placing found messages in a displacement queue, and assigning messages to a frame according to a predetermined order of logical channels, including any displaced messages that fit in the frame. A message is displaced if it will not be sent in a frame of at least one logical channel and will timeout before it can next be sent, and if a message is placed in the displacement queue, then an information element is set in a message, indicating that the number of additional frames is to be read.

The displacement queue may have a length that is based on a maximum number of messages that can be sent in the logical channel and the number of additional frames to be read, and the length may be three and the number of additional frames to be read may be one. Also, the predetermined order of logical channels may be undisplaced messages, other messages, and displaced messages. In addition, the method may further include the steps of removing any displaced messages included in the frame from the displacement queue, and deleting any displaced messages left in the displacement queue and sending respective notification messages for deleted displaced messages. A receiver reads the number of additional frames in response to the set information element.

In another aspect of Applicant's invention, an apparatus for reducing deleted messages includes a device for finding messages to be displaced; a displacement queue, in which found messages to be displaced are stored; a device for setting, if a message is placed in the displacement queue, an information element in a message indicating that the number of additional frames is to be read; and a device for assigning messages to a frame according to a predetermined order of logical channels, including any displaced messages that fit in the frame. A message is displaced if it will not be sent in a frame of at least one logical channel and will timeout before it can next be sent.

The displacement queue may have a length that is based on a maximum number of messages that can be sent in the logical channel and the number of additional frames to be read, and the length may be three and the number of additional frames to be read may be one. The predetermined order of logical channels may be undisplaced messages, other messages, and displaced messages. Displaced messages included in the frame may be removed from the displacement queue, and displaced messages left in the displacement queue may be deleted and a respective notification message may be sent for each deleted displaced message.

BRIEF DESCRIPTION OF THE DRAWINGS

The features and advantages of Applicant's invention will be understood by reading this description in conjunction with the drawings, in which.

DETAILED DESCRIPTION

As described above, the TIA/EIA-136 standard provides for superframes that contain a succession of thirty-two time slots, each of which is assigned to a type of logical channel such as a PCH. As this invention relates primarily to the paging logical channel, this description focuses mainly on the PCH, but it will be understood that the principles of this invention can be applied to other channels and in other access techniques.

Ericsson Radio Systems AB manufactures a CMS88 Cellular Mobile Telephone System that complies with the TIA/EIA-136 standard. Base stations in that system are controlled by computer software that assigns SPACH messages to DCCH superframes according to the following priorities: 1. PCH; 2. ARCH; 3. SMSCH; 4. if none of 1, 2, and 3, then a NULL SPACH frame. Since a SPACH message may require more than the SPACH slots available in a DCCH superframe and since more SPACH messages may need to be sent than the number of SPACH slots, messages are typically queued and sent as SPACH slots become available. Details of how messages are assigned and transported by the SPACH slots in a communication system conforming to the TIA/EIA-136 standard are specified by a SPACH layer 2 protocol that is described in Section 2.5 of TIA/EIA Pub. No. SP-4027-122-A (Nov. 20, 1998), which is incorporated in this application by reference. Of course, it will be appreciated that SPACH messages may be assigned to superframes according to other priorities without departing from the essence of Applicant's invention.

The lengths of such message queues are limited due to limited memory space in the BSs and perhaps a predetermined timeout period for messages. It will be understood that a page message may expire, or "time out", after a predetermined period of time, such as three seconds. "Time out" should also be understood as referring more generally to any change of status or desired handling of a message. In general, the queue lengths are maximized within these constraints and the expected maximum rate of outgoing messages. After all, queuing messages that will not be sent before their timeout periods elapse requires extra memory and processing resources in the BSs for such messages that will be discarded anyway. In the CMS88 system, the ARCH and SMSCH each have a queue of messages that can reach a length of forty messages. Since MSs listen to assigned specific SPACH frames for incoming page messages, there are separate PCH queues having lengths of ten messages for each SPACH frame. Typically there are as many as twenty-four PCH queues, one for each PCH in a superframe.

Figure 5A:
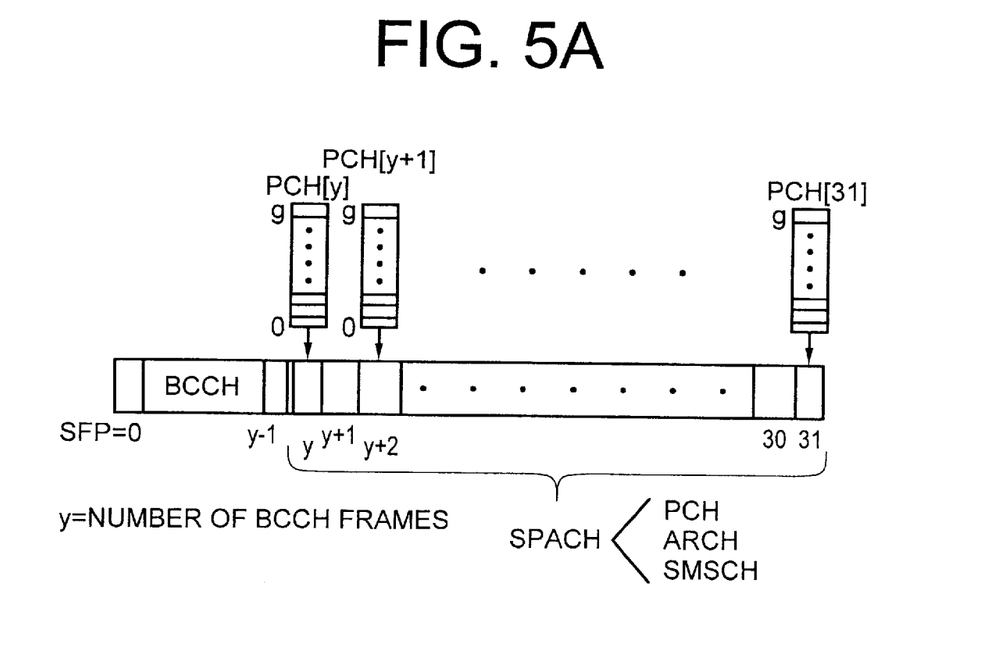
FIGS. 5A, 5B depict ARCH and SMSCH queues and PCH queues for a superframe having thirty-two slots.
Figure 5B:
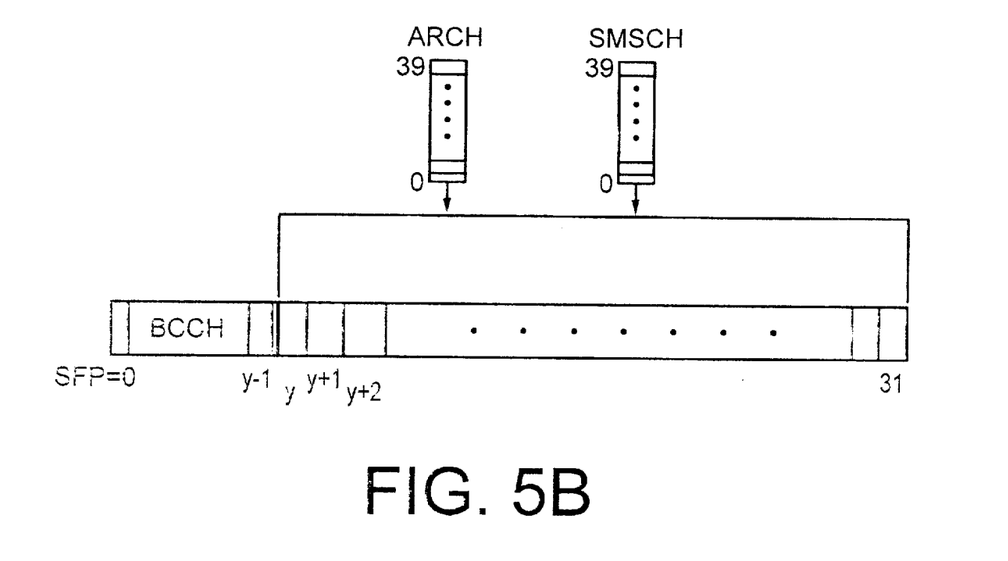

This arrangement of ARCH and SMSCH queues and PCH queues is depicted in FIGS. 5A and 5B, which show one superframe having thirty-two slots respectively identified by a superframe phase (SFP) that takes on integer values between 0 and 31. BCCH messages are assigned to the slots in the superframe between SFP=0 and SFP=y−1, and SPACH messages are assigned to the slots between SFP=y and SFP=31. As seen in FIG. 5A, the PCH slots, e.g., [SFP=y], [SFP=y+2], . . . [SFP=31], each have an associated message queue that may be implemented by a stack of memory locations identified by an index that runs from 0 to 9. FIG. 5B shows that ARCH and SMSCH messages can be queued in respective stacks of memory locations identified by an index that runs from 0 to 39.

As a result of the requirement that page messages can be sent only in assigned PCH slots and the limited queue lengths noted above, PCH congestion can occur, resulting in a higher number of rejected page messages than would otherwise be expected. To see how this can occur, the following example is provided.

According to the TIA/EIA-136 standard, the maximum number of page messages that can be sent in one PCH slot is three when the information identifying the called MS (i.e., the mobile station identity (MSID)) is a MIN. In general, however, the number of page messages that can be sent in one PCH slot depends on the type of page message. For example, only one message-waiting indicator can be sent in a PCH slot, four voice pages can be sent in a PCH slot in a telecommunication system according to the Global System for Mobile (GSM) communication, and five pages can be sent when the information identifying the called MS is a temporary mobile station identity (TMSI). Still other capacities are obtained for other kinds of messages, such as ARCH and SMSCH messages. It is believed likely that only about two page messages can be sent in one PCH slot. As noted above, a page message sent in a primary superframe is repeated in the succeeding secondary superframe, and thus only about two MSs can be paged every 1.28 seconds in each PCH slot, or subchannel, which is an average rate of about 1.56 pages per second.

Unfortunately, practical experience has shown that systems often require actual average paging rates of up to three pages per second. Since an average rate of less than two pages per second is available from one PCH slot, some pages in a PCH queue will be rejected if they must be sent at a rate greater than the available average rate because page messages eventually time out and thus they cannot wait indefinitely to be sent in later superframes.

The probability that three pages in any given second are for the same PCH slot is approximately $1*(1/24)*(1/24)=0.17\%$. Although 0.17% does not seem large, system users (network operators) would usually deem it unacceptable. This estimated probability is similar to page rejection probabilities measured with actual systems, some of which tend to show a non-linear increase in page rejection probability for a linear increase in the number of pages per unit time.

Two obvious solutions to this problem—increasing the PCH queue length and/or the page message timeout length—are unsatisfactory because an increase in the number of page messages that must be sent will cause a proportional decrease in the number of ARCH and SMSCH messages that can be sent. Applicant's solution that is described in more detail below has the advantage of having no impact on either the ARCH or SMSCH message capacity.

According to TIA/EIA-136, when a MS wakes up from sleep mode and reads its assigned PCH, the MS first checks to see if its read PCH slot contains a PCH message addressed to it. If there is no PCH message, then the MS reads other information, in particular a page continuation (PCON) information element in a SPACH header in its read PCH slot. In a TIA/EIA-136 system, the PCON element is one bit in the SPACH header A in the PCH message. If the PCON bit is not set, e.g., it is 0, then the MS may sleep again until the next occurrence of its assigned PCH, but if the PCON bit is set, e.g., it is 1, then the MS reads up to seven additional SPACH slots as determined by a three-bit PCH_DISPLACEMENT element in the F-BCCH information of the DCCH. Thus, PCH displacement is a process by which a MS is directed to continue reading additional SPACH slots after it reads its assigned PCH. For the TIA/EIA-136 standard, this process is described in TIA/EIA Pub. No. SP-4027-121-A, Section 6 (Nov. 20, 1998), and the three-bit PCH_DISPLACEMENT parameter is defined in Section 6.132 of TIA/EIA Pub. No. SP-4027-123-A (Nov. 20, 1998). These sections are incorporated in this application by reference.

One consequence of this PCH displacement process is that it causes the MS to stay awake longer than it normally would, and thus battery life is reduced. This is addressed by Applicant's invention, which utilizes the PCH_DISPLACEMENT element in a way that does not disrupt the MS sleep time too much and simplifies BS implementation. The PCH_DISPLACEMENT element is included in the DCCH structure message broadcast on the F-BCCH, with the PCH_DISPLACEMENT element having an appropriate value (in this example, it is set to one). It will be understood that in accordance with the TIA/EIA-136 standard, the PCH_DISPLACEMENT element is always included in the broadcast DCCH structure message, even when there are no displaced messages.

Figure 6:
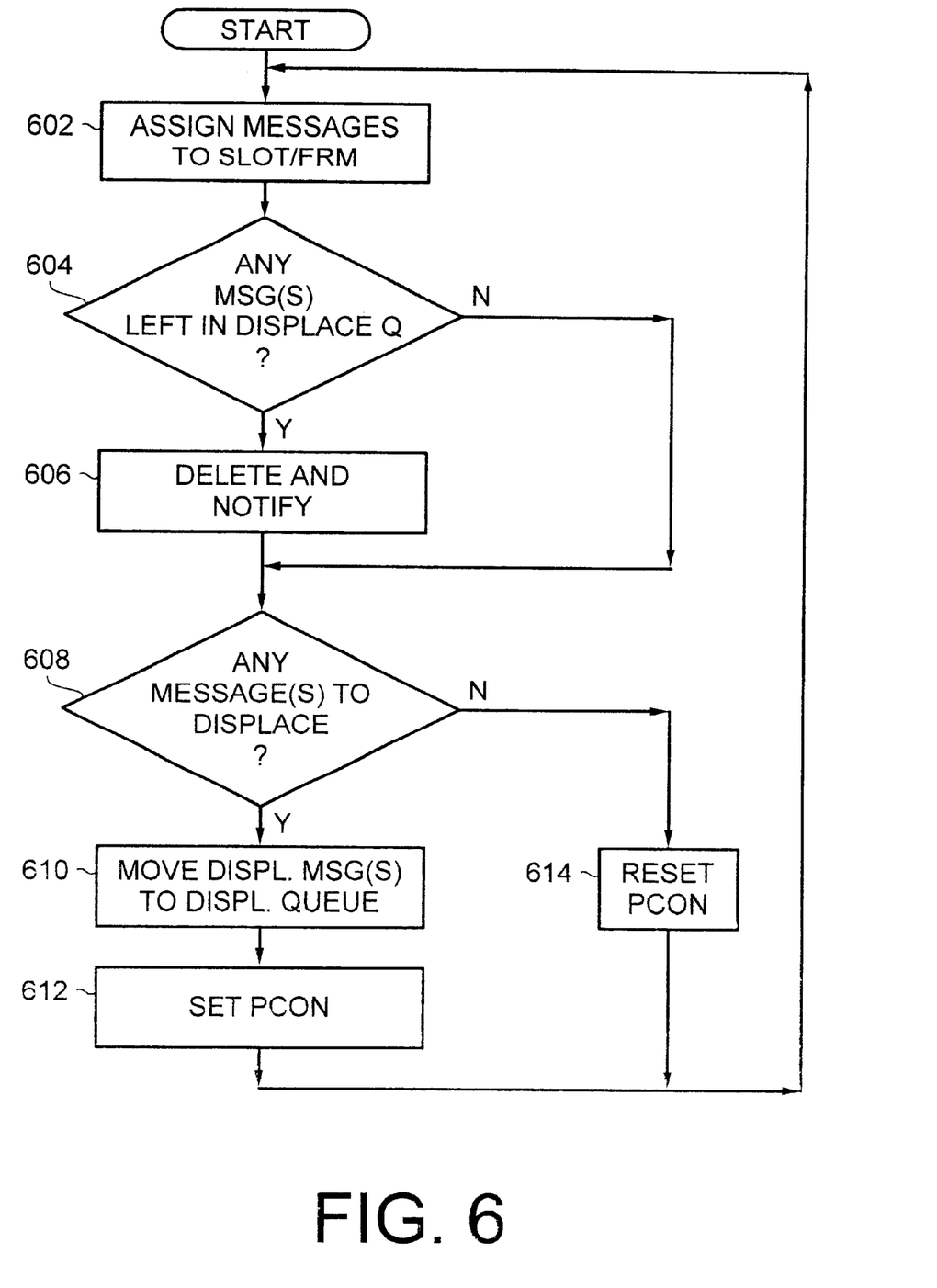
FIG. 6 is a flowchart of a method in accordance with Applicant's invention.

It will also be understood that in general the PCH_DISPLACEMENT element can have a value other than one and can have a range greater than 0–7 as in a TIA/EIA-136 communication system. Of course, the length of the displacement queue is related to the PCH_DISPLACEMENT element, or equivalent information elements for other logical channels. The displacement queue length is determined by the maximum number of messages that can be sent in each slot and the number of additional slots that is to be read when the PCON information element is set. A description of a method in accordance with Applicant's invention is depicted in FIG. 6 and is described below with the help of FIG. 7.

In Applicant's method, a queue for displaced PCH messages is created and manipulated by a BS. This displacement queue needs only to be x messages long, where x is the maximum number of page messages that can be sent in a PCH slot, assuming one additional slot is to be read. For a system using MSID-type MINs, x=3, as described above. One of the advantages of Applicant's invention is that the communication system needs only one displacement queue that is managed (i.e., filled and emptied) for each successive SPACH frame. The method includes the following steps that are carried out for each SPACH frame.

As described above, the BS assigns SPACH messages to DCCH superframes (step 602), viz., the BS builds a SPACH frame, according to a set of predetermined priorities, preferably the following: 1. normal (i.e., not displaced) PCH messages; 2. ARCH messages; 3. SMSCH messages; 4. displaced PCH messages; 5. if none of 1, 2, 3, and 4, then a NULL SPACH frame. In building a PCH slot in a SPACH frame, the BS starts with normal PCH messages that have arrived for transmission, includes any displaced PCH messages that will fit in the frame with the normal PCH messages, and removes the included displaced messages from the displacement queue. If any displaced PCH messages are left in the displacement queue after the PCH slot/SPACH frame is assembled (step 604), they are deleted and a page rejection notification message is sent for each deleted displaced PCH message (step 606).

After building a SPACH frame, the BS finds (step 608) up to x PCH messages that will not be sent in that frame (in particular in a PCH slot in that frame) and that will timeout before they can next be sent (e.g., in the next hyperframe for a system in accordance with TIA/EIA-136). These are PCH messages that are to be displaced by removing them from the current PCH queue and placing them in the displacement queue (step 610). If there are any PCH messages placed in the displacement queue, then the PCON information element is set, e.g., to 1, in the SPACH header A message of the current SPACH frame (step 612). If there are no PCH messages to be displaced, the PCON information element is reset, e.g., to 0 (step 614), and the flow can return to step 602 for building the next SPACH frame.

Figure 7:
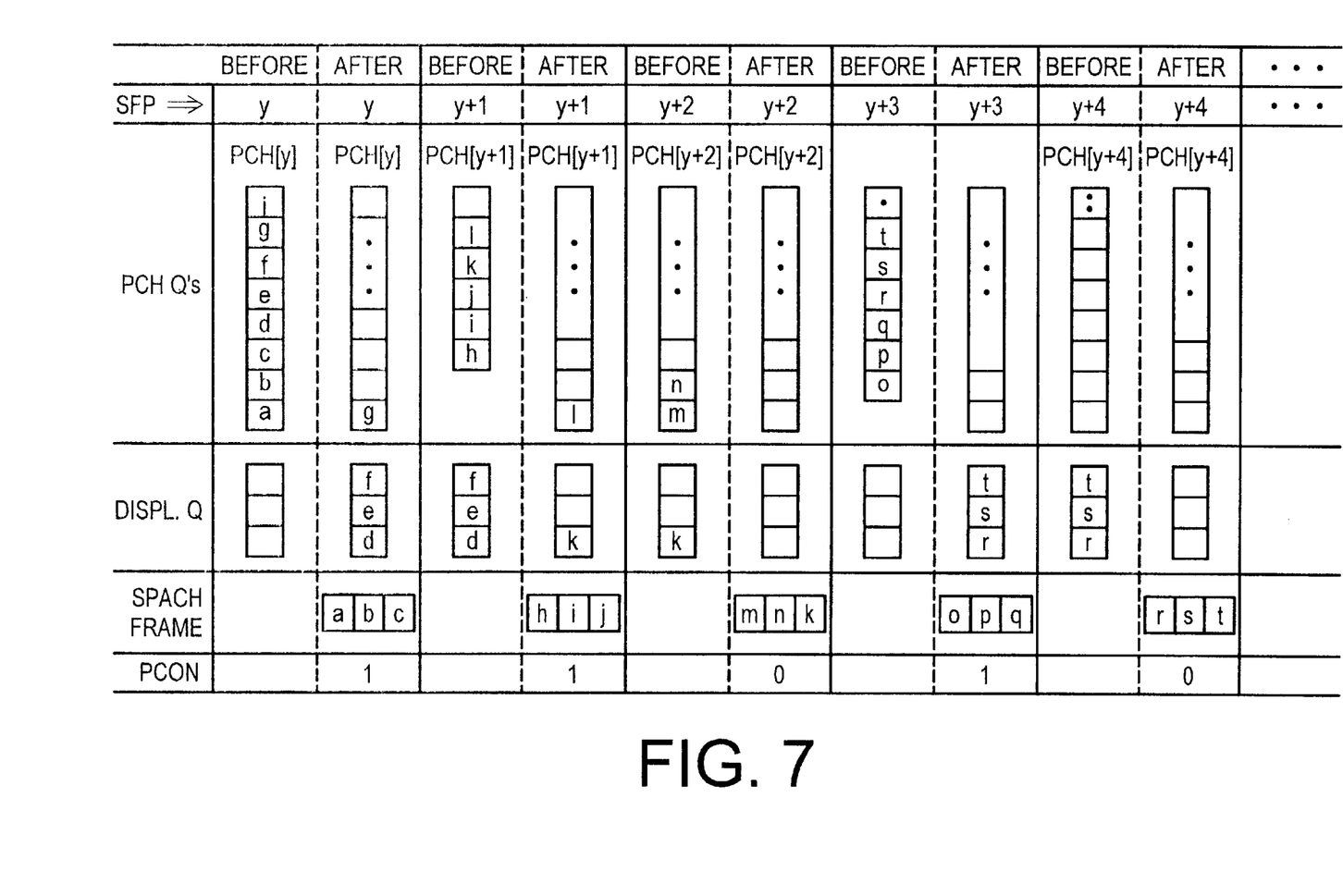
FIG. 7 shows PCH message contents of PCH queues, a displacement queue, and SPACH frames.

The operation of these steps can be seen by comparing successive slots in FIG. 7, which shows the PCH message contents of the PCH queues, displacement queue, and a SPACH frame before and after the SPACH frame is assembled for slots SFP=y through SFP=y+4. It will be noted that SPACH header messages are not depicted in FIG. 7 for clarity since these and other details would be understood by those of ordinary skill in this art.

Before the SPACH frame is built with slot SFP=y, a number of page messages a, b, . . . , g are present in the PCH queue for this slot. If three pages can be included in a PCH slot and if page messages d, e, f will timeout before they can next be sent, then after the SPACH frame is built with this slot, the pages a, b, c are included in the SPACH frame, three pages d, e, f have been removed from the PCH queue and placed in the displacement queue, and page g remains in the PCH queue. Since messages are present in the displacement queue, the PCON information element in the SPACH header is set, e.g., PCON=1.

Before the SPACH frame is built with slot SFP=y+1, newly arrived page messages h, i, . . . , l are present in the PCH queue for this slot, and pages d, e, f remain in the displacement queue. (It can be noted that page g is not shown in the PCH queue for slot SFP=y+1 because page g is in the queue for the PCH that includes slot SFP=y.) After the SPACH frame is built with this slot, pages h, i, j are included in the SPACH frame, since these non-displaced pages have priority over the displaced pages d, e, f in the displacement queue. (As messages d, e, f could not be sent, they are deleted from the displacement queue and notifications are sent for those messages.) In addition, a page k has been moved to the displacement queue since it will otherwise timeout, page l remains in the PCH queue since it will not time out if it is not sent at this time, and again since messages are present in the displacement queue, the PCON information element in the SPACH header is set.

Before the SPACH frame is built with slot SFP=y+2, newly arrived page messages m, n are present in the PCH queue for this slot, and page k remains in the displacement queue. (As noted above, page l is not shown in the PCH queue for slot SFP=y+2 because page l is in the queue for the PCH that includes slot SFP=y+1.) After the SPACH frame is built with this slot, pages m, n, k are included in the SPACH frame, since there is room in the frame for the non-displaced pages m, n and for the displaced page k. No pages remain in either the PCH queue or the displacement queue, and since no messages are present in the displacement queue, the PCON information element in the SPACH header is reset, e.g., PCON=0.

Before the SPACH frame is built with slot SFP=y+3, newly arrived page messages o, p, . . . , t are present in the PCH queue for this slot. After the SPACH frame is built with this slot, pages o, p, q are included in the SPACH frame, pages r, s, t have been placed in the displacement queue, and the PCON information element in the SPACH header is set.

Before the SPACH frame is built with slot SFP=y+4, no newly arrived page messages are present in the PCH queue for this slot and pages r, s, t remain in the displacement queue. After the SPACH frame is built with this slot, pages r, s, t are included in the SPACH frame, which has room for these displaced pages, and the PCON information element in the SPACH header message is reset.

Configuring a BS to implement this method reduces the effects of PCH congestion by providing one more chance for pages to be sent to a MS. It can also be seen that this method has no impact on ARCH or SMSCH message capacity because a separate displacement queue is provided for displaced page messages and displaced page messages are given lower priority in assembling SPACH frames.

Furthermore, Applicant's method increases the probability that a MS will receive a given page message while having minimal effect on MS sleep time. A MS is required to stay awake for only one more SPACH frame (20 ms, when the PCH_DISPLACEMENT parameter is one) to listen for displaced page messages addressed to it, and this is required only when the PCON information element is set. In general, a MS would stay awake for the number of additional frames given by the PCH_DISPLACEMENT parameter.

It will be noted that this description and the drawings are illustrative only and that one of ordinary skill in the art would recognize that various modifications can be made without departing from the essence of this invention, which is defined by the following claims. For example, Applicant's method is not necessarily limited to paging channels but can be applied to relieve congestion on other logical channels having appropriate configurations.

What is claimed is:

1. A method of reducing deleted messages in a transmitter that sends messages organized in frames, superframes, and logical channels, at least one of the channels including structure messages that describe the organization of the frames and logical channels and a number of frames to be read by a receiver, including a number of additional frames that should be read when at least one displaced message exists, the method comprising the steps of:

finding messages to be displaced, wherein a message is displaced if it will not be sent in a frame of at least one logical channel and will timeout before it can next be sent;

placing found messages to be displaced in a displacement queue, and if a message is placed in the displacement queue, then setting in a message an information element indicating that the number of additional frames is to be read; and assigning messages to a frame according to a predetermined order of logical channels, including any displaced messages that fit in the frame.

2. The method of claim 1, wherein the displacement queue has a length that is based on a maximum number of messages that can be sent in the logical channel and the number of additional frames to be read.

3. The method of claim 2, wherein the length is three and the number of additional frames to be read is one.

4. The method of claim 1, wherein the predetermined order of logical channels is undisplaced messages, other messages, and displaced messages.

5. The method of claim 1, further comprising the steps of:

removing any displaced messages included in the frame from the displacement queue; and deleting any displaced messages left in the displacement queue and sending a respective notification message for each deleted displaced message.

6. The method of claim 1, wherein the receiver reads the number of additional frames in response to the set information element.

7. An apparatus for reducing deleted messages in a transmitter that sends messages organized in frames, superframes, and logical channels, at least one of the channels including structure messages that describe the organization of the frames and logical channels and a number of frames to be read by a receiver, including a number of additional frames that should be read when at least one displaced message exists, the apparatus comprising:

means for finding messages to be displaced, wherein a message is displaced if it will not be sent in a frame of at least one logical channel and will timeout before it can next be sent;

a displacement queue, in which found messages to be displaced are stored;

means for setting, if a message is placed in the displacement queue, an information element in a message indicating that the number of additional frames is to be read; and means for assigning messages to a frame according to a predetermined order of logical channels, including any displaced messages that fit in the frame.

8. The apparatus of claim 7, wherein the displacement queue has a length that is based on a maximum number of messages that can be sent in the logical channel and the number of additional frames to be read.

9. The apparatus of claim 8, wherein the number of additional frames to be read is one and the length is three.

10. The apparatus of claim 7, wherein the predetermined order of logical channels is undisplaced messages, other messages, and displaced messages.

11. The apparatus of claim 7, wherein displaced messages included in the frame are removed from the displacement queue, and displaced messages left in the displacement queue are deleted and a respective notification message is sent for each deleted displaced message.

* * * * *